United States Patent [19]

Hennig et al.

[11] Patent Number: 4,876,311
[45] Date of Patent: Oct. 24, 1989

[54] OPAQUE SYNTHETIC RESINS

[75] Inventors: Jürgen Hennig, Darmstadt; Heinz Vetter, Rossdorf; Manfred Munzer, Bensheim, all of Fed. Rep. of Germany

[73] Assignee: Rohm GmbH Chemische Fabrik, Darmstadt, Fed. Rep. of Germany

[21] Appl. No.: 166,726

[22] Filed: Mar. 1, 1988

Related U.S. Application Data

[63] Continuation of Ser. No. 893,808, Aug. 6, 1986, abandoned.

[30] Foreign Application Priority Data

Aug. 6, 1985 [DE] Fed. Rep. of Germany ....... 3528165

[51] Int. Cl.$^4$ .................. C08L 33/06; C08L 69/00
[52] U.S. Cl. .................................. 525/229; 525/148; 525/216; 525/222; 525/227; 525/228; 525/239
[58] Field of Search ............... 525/148, 216, 222, 227, 525/228, 229; 523/201

[56] References Cited

U.S. PATENT DOCUMENTS 3,992,486 11/1976 Lang ..................................... 260/885
4,464,513 8/1984 Kishida et al. ...................... 525/227

FOREIGN PATENT DOCUMENTS 55-93102  7/1980  Japan .
56-117225 9/1981  Japan .
57-05742  1/1982  Japan .
1370785 10/1974 United Kingdom .

Primary Examiner—Theodore E. Pertilla
Attorney, Agent, or Firm—Oblon, Spivak, McClelland, Maier & Neustadt

[57] ABSTRACT

The invention relates to opaque synthetic resins containing 1 to 30% by weight of cross-linked beads consisting of a polymer comprised of:

(i) 9.9 to 59.9% by weight of at least one radically polymerizable monomer A containing an aromatic residue or nonaromatic monomers A' which contain a halogen;

(ii) 90 to 40% by weight of vinyl monomers B which are copolymerizable with these monomers but different from them;

(iii) 0.1 to 20% by weight of at least one cross-linking monomer V and (iv) 0 to 10% by weight of a strongly polar monomer H and where (a) the refractive index of the polymer is higher than that of the polymer matrix and that (b) the average bead size of the beads is in the range of 20 to 50 microns.

3 Claims, No Drawings

OPAQUE SYNTHETIC RESINS

This application is a continuation of application Ser. No. 893,808 filed on Aug. 6, 1986, now abandoned.

FIELD OF THE INVENTION

The invention relates to opaque synthetic resins and particularly to shaped and extended articles *which are particularly suitable for light projection screens, for instance, as television projection screens.
*produced from per se transparent polymers

DISCUSSION OF THE BACKGROUND

Some technical problems can be solved by using only partially transparent glasses. These problems include the matting of glazings as well as the production of projection screens and other optical viewing items.

Usually one uses light refraction or light dispersion at phase interfaces such as occur, for instance, when particles of suitable dimensions are imbedded as the dispersing phase in a carrier phase and both phases have different refractive indices. The carrier phase preferably consists of appropriate synthetic resins. Aside from inorganic particles such as, for example, glass beads, industry has developed suitable polymer particles for imbedding in the carrier phase.

A polymerization process for manufacturing fine polymer particles is known through DE-OS No. 21 46 628. In this process, a monomer system (A) is disclosed which is capable of free radical addition polymerization and which contains 87 to 99.99% by weight of a monoethylenically unsaturated monomer and 0.01 to 3% by weight of at least one polyunsaturated monomer. This monomer system completely dissolves 5 to 50% by weight (as related to the entire mixture) of another soluble thermoplastic addition polymer in which the first polymer will be insoluble. The solution is subject to conditions in which the monomer system polymerizes by means of free radicals and forms basically spherical cross-linked polymer particles in which the particles have an average particle size of 0.5 to 30 microns and are dispersed in a continuous phase of the thermoplastic polymer.

According to this reference, the polymer particles are cross-linked and, therefore, are generally not subject to melting or distortion so that they cannot for instance, be pressed with powders or subjected to a jet-molding process.

In the form of a solution, the polymer can be sprayed onto acrylic resin plates. Possible uses of this polymer are as a matting lacquer and also as mixtures which are suitable for the production of viewing screens with revertive projection, in computers, in the television or film industry, and in photography.

Also known from DE-OS No. 21 46 607 are transparent to opaque mixtures of synthetic resins which contain spherical, cross-linked addition polymer particles containing 87 to 99.99% by weight of at least one monoethylenically unsaturated monomer and 0.01 to 3% by weight of a monomer cross-linking agent dispersed in a continuous phase of an addition polymer, whereby the addition polymer should be soluble in the mixed monomers. The mixture of synthetic materials preferably also contains an additional mixed polymerized cross-linking agent. Self-supporting, transparent plastic plates, plastic tracks and similar items are mentioned as areas of use. Matted plastics are obtained by spraying a solution of the polymer material onto acrylic sheets. The mixture is, moreover, supposed to be suitable for viewing screens with revertive projection.

Japanese JP-OS 80 93 102 (Chemical Abstracts 93, 240792y) describes light-dispersing acylic resin plates in sandwich configuration which are obtained by means of a continuous belt polymerization from an acrylic resin film and acylate monomers, which contain a light-dispersing agent.

From Japanese JP-OS No. 81 117 225 (Chemical Abstracts 96, 86627b), optical screens are known which have a broad light diffusion effect in one direction and, in the other direction, a lenticular effect.

These screens are produced by calendering pulverized glass fibers into modified acrylic resin with subsequent uniaxial stretching, followed by a final coating with an acrylic layer containing carbon black.

Light-dispersing acrylic resin plates as projection screens are the subject of JP-OS No. 82 05742 (Chemical Abstracts 96, 200768a) in which the desired light dispersion is achieved by small imbedded quartz beads with a diameter of 0.5–20 microns in PMMA. According to GB-PS No. 1 585 338 light-dispersing plates with better optical resolution, a larger optical half-value angle and greater flexibility than conventional glass fiber plates are obtained if one uses plates of synthetic materials which are filled with glass beads. The glass beads have a diameter of 0.001 to 0.05 mm. Thermoplastics such as cellulose ester, polycarbonate, polyarylsulfonate, polystyrene, or acrylic resin are mentioned as carrier materials.

Previously known solutions concerning transparent to opaque mixtures of synthetic resins and their use for producing plates or sheeting materials have not been found to be entirely satisfactory.

In particular, the requirements for optical projection screens have not been fully met. There continues, therefore, to be a need for a method of producing opaque plastics without significant technical disadvantages.

SUMMARY OF THE INVENTION

Accordingly, one object of this invention is to provide a novel opaque synthetic resin in the solid state suitable for use as shaped and extended articles.

Another object of the invention is to provide an opaque solid synthetic resin suitable for use as light projection screens and in particular television projection screens.

A further object of the invention is to produce opaque synthetic resin by an extrusion method which does not have significant technical disadvantages.

These objects and other objects of the invention which will become apparent from the following specification have been achieved by the opaque, solid particularly shaped and extended synthetic resins of the present invention. These plastic materials meet the requirements for optical projection screens, especially television projection screens, particularly well if one adds cross-linked beads to a polymer matrix (PM) in amounts of 1 to 30% preferably 1.5 to 20%, in particular 2 to 10% by weight relative to the polymer matrix (PM). The cross-linked beads consist of polymer P which comprises (i) 9.9 to 59.9% by weight of at least one monomer A, capable of being radically polymerized and which contains an aromatic residue or nonaromatic monomers A' which contain a halogen; (ii) 90 to 40% by weight vinyl monomers B, which are copolymerizable with monomers A or A' but are different from them; (iii) 0.1 to 20% by weight of at least one cross-linking monomer V; and (iv) 0 to 10% by weight of a strongly polar monomer H, with the provisions that (a) the refractive index of polymer P is higher than that of the polymer matrix PM and that (b) the average bead size of the beads is from 5 to 50 microns and preferably from 20 to 35 microns.

DETAILED DESCRIPTION OF THE PREFERRED EMBODIMENTS

The monomers A which can be radically polymerized and which contain an aromatic residue, have the formula I

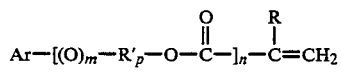

wherein Ar is an unsubstituted aromatic hydrocarbon residue, particularly a phenyl residue, or a substituted aromatic residue with up to 12 carbon atoms, preferably a substituted aromatic residue with $C_1$–$C_4$ alkyl residues or with fluorine, chlorine, or bromine, or substituted with both types of substituents; R is hydrogen or methyl; R' is a branched or straight chain alkyl residue with 1 to 8 carbon atoms; n is 0 or 1; m is 0 or 1; and p is 0 or 1 with the condition that, if p equals 0, m should also equal 0.

Homo- and copolymers formed only from formula I monomers, as a rule show a refractive index $N_d$ of >1.56.

The appropriate formula I monomers are styrene and its alkyl-substituted derivatives such as alpha-methyl, para-methyl and para-ethylstyrene, as well as halogenated derivatives of styrene such as para-chlorostyrene. Further formula I monomers A within the present invention are, for instance, phenyl acrylate and phenyl methacrylate, xylenyl methacrylate and xylenyl acrylate, especially the meta types, 4-methylphenyl acrylate and 4-methylphenyl methacrylate, 2-phenylethyl acrylate and 2-phenylethyl methacrylate, 3-phenyl-1-propyl methacrylate and 3-phenyl-1propyl acrylate, 2-phenyloxyethyl acrylate and 2-phenyl-oxyethyl methacrylate.

The nonaromatic halogen containing monomers A' include, particularly, chlorine or bromine in a non activated bonding such as alpha-chloro and alpha-bromo acrylic and methacrylic acid esters of $C_1$–$C_6$ alcohols such as alpha chloro acrylic acid methyl ester as well as vinyl chloride and vinylidene chloride.

Among the vinylic, copolymerizable monomers B are compounds having formula II

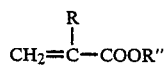

in which R is hydrogen or methyl and R'' is a branched or unbranched, straight chain or cyclic alkyl group with 1 to 8 carbon atoms, wherein the cyclic alkyl group has at least 5 ring carbon atoms.

Different compounds may be used for the monomers of the A, B, and C groups each time insofar as this corresponds to the desired characteristics. The homo- and copolymers formed only with formula II monomers usually have a refractive index $N_d$ of <1.51, generally <1.49.

Appropriate vinyl monomers B are chosen in such a way that the resulting dilatometrically determined glass temperature ($T_g$) of a polymer, or copolymer, made of these monomers would be at least 80° C. (Concerning $T_g$ and the contributions of monomers, see Brandrup-Immergut; Polymer Handbook and b. Vieweg and F. Esser, Handbook of Synthetics, Vol. IX, Hanser Verlag 1975, pp. 333–340; T. G. Fox, Bulletin Am. Phys. Soc. 1, 125, 1956.)

It is particularly preferred for the vinyl monomer B to consist entirely, or at least to 40% by weight, of methyl methacrylate.

The cross-linking monomers V are the previously known radical linking agents. The cross-linking monomers generally possess more than one unit in the molecule that can be radically polymerized. For example, those which contain two vinyl groups, such as divinyl benzene; and also acrylic and methacrylic acid esters and acrylamides and methacrylamides of polyols such as glycol di(meth)acrylate, 1,3- and 1,4-butanediol(-meth)acrylate, trimethylolpropane tri(meth)acrylate, tetraethyleneglycol di(meth)acrylate, etc. Other monomers include those which contain a vinylidene group and which contain (potential) amide methylol-, carbamide methylol ether-, azalactone and epoxy groups, such as N-methylol (meth)acrylamide, methylene bisacrylamide and methylene bismethacrylamide, and glycidyl (meth) acrylate.

Particularly preferred are cross-linking monomers with unsaturated groups of graded reactivity in the molecule such as the vinyl, allyl and crotyl esters of acrylic and/or methacrylic acid. (See H. Rauch-Puntigam, Th. Völker, Acryl- und Methacrylverbindungen Acrylic and Methacrylic compounds, Springer Verlag, Berlin, 1967.)

Cross-linking, among other things, should have the effect that the beads will not melt when processed at higher temperatures (up to about 300° C.).

The polymer beads are made in known ways in accordance with the process of bead polymerization. In this process the monomers A, B and V are distributed as the dispersed phase in a non-dissolving medium (continuous phase) by the action of mechanical forces (stirring) and polymerized in this form. The polymer thus formed is primarily soluble in the monomers. As a result of interfacial tension, the monomer forms spherical drops. To maintain the drop-shape during polymerization and to prevent the drops from running together, so-called "dispersants" or distributors (protective) colloids are added to the polymerization preparation. These are preferably substances which can be completely separated from the formed bead-shaped polymer after polymerization has ended.

The "distributor" has the effect of stabilizing the monomer drops once they have formed to such an extent that a combining of drops does not, for all practical purposes, take place.

As a rule, water is used as the continuous phase. Therefore, polymerizable radical monomers, which are barely soluble or insoluble in water, are used for polymerization. (See Houben-Weyl, 4th ed., Vol. XIV/1, Macromolecular Substances, pp. 406–433, G. Thieme-Verlag 1961.)

Suitable distributors are water-insoluble salts of inorganic acids such as barium sulfate, barium carbonate, natural substances with high molecular weight or synthetic polymers. To the group of high molecular weight distributors belong water-soluble colloids such as polyvinyl alcohol, partially saponified polyvinyl acetate, methyl cellulose, starch, gelatin, pectin, alkaline salts of polyacrylic acid, or alkaline salts of styrene or vinylacetate/maleic acid anhydride copolymers, and others. (See Houben-Weyl, above, pp. 411–430.) The ratio of the aqueous to the monomer phase is usually about 2:1 to 4:1. As is wellknown, initiators are used for bead polymerization which are essentially soluble in the monomers but insoluble in water. The quantity of initiator used is usually between 0.1 to 1% by weight, and preferably about 0.5% by weight, relative to the monomers. The normal monomer-soluble organic peroxides or corresponding azo compounds are used as initiators; for instance, dibenzoyl peroxide, lauroyl peroxide, and azo-isobutyronitrile. In addition radical forming agents with higher decomposition temperatures may be used if the temperature is raised toward the end of the reaction to achieve polymerization that is as complete as possible. The size of the beads can be adjusted within the claimed range between 20 and 50 microns.

In addition, regulators such as the usual sulfur regulators, e.g., aliphatic mercaptans, for example, lauryl mercaptan and tertiary dodecyl mercaptan, can be added to the bead polymerization reaction. The weight-average molecular weight ($\overline{M}_w$) of the polymer P, would it not be crosslinked would be in the range of 1 to $2\times 10^5$ g/mole ($\overline{M}_w$ determined by gel permeation chromatography c.f. Kirk-Othmer, Encyclopedia of Chemical Technology, 3rd. Ed. Vol. 18, pp. 748–749, J. Wiley 1982)

Furthermore, the generally used lubricants, such as fatty alcohols, stearic acid ester, palmitic acid ester, or natural waxes, can be added, preferably before polymerization.

The polymerization is carried out in such a way that the water; the monomers A, B, and V; initiator; dispersing agent, and, if necessary, lubricant are mixed together and then heated, e.g., to 90° C. If necessary, and especially above 95° C., external cooling may be used to reduce excess heat of polymerization Temperatures above 115° C. should be avoided. The duration of polymerization is between 1 and 5 hours. The viscosity of the polymer preparation (measured with Brookfield viscosity meter) is generally in the range of 8,000 to 800 centipoise.

The partially reactive lubricants are preferably added only after a conversion of about 20% has taken place. The addition of regulators can also occur during the polymerization process.

After the reaction has ended, the beads are generally separated by filtration or by a centrifuge. Adhering additives can be removed in a suitable way, for instance, by washing with diluted acid and water. The beads are generally dried by heating, preferably by circulating air in heat cabinets.

The polymer matrix PM, to which the beads are added, is as a rule composed of transparent, generally thermoplastic synthetics which are already being used industrially for light projection articles.*
*(c.f. R. Vieweg U. D. Braun, Kunststoff-Handbuch, Band I, Grundlagen, pp. 632–720, C. Hanser 1975, which should also be consulted for physical measurements)

The relationship between P and PM is determined, among other things, by the fact that the difference of the refractive index $n_D$, bead minus $n_D$, polymer matrix should have a value of at least 0.01 preferably 0.02 and more preferably 0.04.

Polystyrene, PVC, polyvinyl acetate, polycarbonate, polyolefins and, particularly, acrylic resins are suitable synthetic substances for the polymer matrix.

Acrylic resins according to the invention include polymers which consist of at least 50% by weight of monomer esters of acrylic or methacrylic acid, especially those having structures given by formula II.

To produce the opaque synthetic articles of the present invention, the beads which consists of the polymer P must be introduced into and then distributed in the polymer matrix.

It must be regarded as particularly surprising that it is possible to distribute the beads with the help of extrusion devices in the course of processing the polymer matrix PM. In this manner, the beads are introduced into the extrusion melt.

It is surprising that (a) the beads under the temperature and shearing conditions of an extrusion process would still maintain their shape and that (b) the homogenous distribution of the beads, which is essential for achieving the desired light-dispersing effect could be realized. Moreover, surprisingly, the refractive index changes markedly at the interfaces between polymer matrix PM and the polymer beads, which is necessary for achieving the required light-dispersing effect. It should have been expected that this difference in the refractive index at the above-mentioned interfaces could be "levelled out" by diffusion processes, as happens, for instance, when the beads are introduced into polymerizable monomers, which would result in an undesirable change in the dispersing effect.

Obviously, numerous modifications and variations of the present invention are possible in light of the above teachings. It is therefore to be understood that within the scope of the appended claims, the invention may be practiced otherwise than as specifically described herein.

Having generally described this invention, a further understanding can be obtained by reference to certain specific examples which are provided herein for purpose of illustration only and are not intended to be limiting unless otherwise specified.

For evaluation of optical properties the following terms are used: Transmission is the ratio of transmitted brightness to incident illumination [in percent]. Half brightness angle is the angle at which the brightness is one half of maximum transmitted brightness.

EXAMPLE 1

Bead polymerization

In a 100 l vessel made of V4A steel equipped with a nitrogen inlet and an impeller stirrer 600 g of $Al_2(SO_4)_3 \times 18H_2O$ and 6 g of sodium paraffinsulfonate (Product R Statexan from Bayer, Leverkusen) are dissolved in 50 l of deionized water at 85° C. and with stirring at 350 rpm. The aluminium compound used as despersant is precipitated by adding 264 g of sodium carbonate.

Subsequently a monomer mixture of 5.9 kg of methyl methacrylate, 4.0 kg of styrene, 0.1 kg of glycol dimethacrylate, 0.2 kg of dilauroyl peroxide is added under nitrogen. Polymerization is carried out at 80° C. for 140 min and subsequently at 90° C. for 60 min whilst stirring is continued. The polymerization mixture when cooled to 50° C. is treated with 600 ml of sulfuric acid (50%) to dissolve the dispersant. The bead material is collected on a filtering funnel, is washed with deionized water and is dried on hurdles for 20 hours at 50° C.

The average size of the beads (median value) thus produced is 37 microns. The refractive index of the beads is found to be 1.53.

EXAMPLE 2

Production of light dispersing plates by extrusion (c.f. Kirk-Othmer, 3rd Ed. Vol. 18, pp. 185-190, ibidem Vol. 15, pp. 632-637)

In a twin cone-and-screw mixer 96.5 parts by weight of polymethyl methacrylate moulding material (®PLEXIGLAS 7N produced by Röhm GmbH) and 3.5 parts by weight of the beads as produced in example 1 are mixed, optionally with addition of adhesion promoters as employed in the art. The mixture is extruded in a single screw extruder with degassing at a material temperature of 245° C. to yield plates 3.2 mm thick. Transmission was determined to be 87 to 89%: Half brightness angle is 8±1.5°.

These plates fully meet the requirements with regard to light dispersion and mechanical properties. Alternatively the beads may be added to the extruder melt. This way of processing also yields very good results.

What is claimed as new and desired to be secured by Letters Patent of the United States is:

1. An opaque synthetic resin comprising (a) a polymer matrix selected from the group consisting of polystyrene, polyvinyl chloride, polyvinyl acetate, polycarbonate, polyolefins and acrylic resins and (b) cross-linked beads wherein said cross-linked beads are prepared by bead polymerization in aqueous media, isolated from said aqueous media and then added to said polymer matrix in an extruder, said polymer matrix being in a molten state, and extruded to produce said opaque synthetic resin, wherein said polymer matrix comprises 1-30 wt.% of said cross-linked beads relative to said polymer matrix and wherein said cross-linked beads consist essentially of 9.9-59.9 wt.% styrene, 90-40 wt.% methylmethacrylate, and 0.1-20 wt.% of at least one cross-linking monomer, and wherein the refractive index of said bead polymer is higher than the refractive index of said polymer matrix, and wherein the average size of said cross-linked beads is within the range of 5-50 microns.

2. The opaque synthetic resin of claim 1, wherein said acrylic resins comprise polymers which consist of at least 50 wt.% of acrylic or methacrylic acid esters having the following formula:

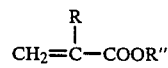

wherein R is hydrogen or methyl and R″ is a branched or unbranched, straight-chain or cyclic alkyl group with 1-8 carbon atoms, and wherein said cyclic alkyl group has at least 5 ring carbon atoms.

3. The opaque synthetic resin of claim 1, wherein said polymer matrix is polymethylmethacrylate.

* * * * *